US008925173B2

(12) United States Patent
Smith et al.

(10) Patent No.: US 8,925,173 B2
(45) Date of Patent: Jan. 6, 2015

(54) AUTOMATED THREE NAIL GUN TOOL DOLLY

(75) Inventors: Aubrey Smith, Cordova, TN (US); Stephen Fleming, Southaven, MS (US); Robert Tucker, Memphis, TN (US); Douglas Dodd, Hernando, MS (US)

(73) Assignee: Illinois Tool Works, Inc., Glenview, IL (US)

( * ) Notice: Subject to any disclaimer, the term of this patent is extended or adjusted under 35 U.S.C. 154(b) by 886 days.

(21) Appl. No.: 12/285,154

(22) Filed: Sep. 30, 2008

(65) Prior Publication Data

US 2009/0100662 A1 Apr. 23, 2009

Related U.S. Application Data

(60) Provisional application No. 60/960,527, filed on Oct. 2, 2007.

(51) Int. Cl.
*B27F 7/02* (2006.01)
*B23P 11/00* (2006.01)
*B27F 7/00* (2006.01)

(52) U.S. Cl.
CPC ...................................... *B27F 7/006* (2013.01)
USPC ............. 29/432; 227/110; 227/111; 227/109; 29/525.01; 29/798; 29/54

(58) Field of Classification Search
CPC ............... B27F 7/02; B27F 7/025; B27F 7/05
USPC .............. 29/525.01, 798, 565, 432, 716, 823, 29/772, 50, 51, 52, 54; 227/7, 110, 111, 227/102, 2, 4, 100, 109, 117

See application file for complete search history.

(56) References Cited

U.S. PATENT DOCUMENTS 2,732,553 A * 1/1956 Bensemann .................. 227/109
2,856,606 A * 10/1958 Richards ....................... 227/109
3,261,527 A * 7/1966 Sterner ............................ 227/7
3,273,776 A * 9/1966 Bryson ......................... 227/109
3,290,966 A * 12/1966 Gesko ............................ 408/16
3,628,714 A * 12/1971 Offenwanger .................... 227/7
3,765,587 A * 10/1973 Davis ............................ 227/100
3,777,357 A * 12/1973 Whitney et al. ................. 29/429
3,820,704 A * 6/1974 Stanley ......................... 227/110
3,822,958 A * 7/1974 Lewis ............................. 408/46
3,837,556 A * 9/1974 Doyle et al. .................. 227/136
3,876,128 A * 4/1975 Feren ................................ 227/7

(Continued)

FOREIGN PATENT DOCUMENTS

WO WO 9406597 A1 * 3/1994 ................ B27F 7/02

*Primary Examiner* — Essama Omgba
(74) *Attorney, Agent, or Firm* — Law Offices Of Steven W. Weinrieb

(57) ABSTRACT

A new and improved automated gun tool dolly which comprises a plurality of nail guns, such as, for example, three nail guns, which are mounted upon a horizontally movable carriage assembly in a vertically and horizontally staggered mode so as to be disposed within a diagonal array. Movement of the carriage assembly along horizontally oriented guide rails is automatically controlled, such as, for example, by means of a programmable logic controller (PLC), such that the three nail guns are sequentially and continuously disposed at predetermined firing positions at which the nail guns are sequentially fired so as to insert nails within predetermined regions of 2×4 or 2×6 plate, header, or footer members of a wall panel or wall structure.

21 Claims, 4 Drawing Sheets

(56) References Cited

U.S. PATENT DOCUMENTS

| | | | | | |
|---|---|---|---|---|---|
| 4,392,599 | A | * | 7/1983 | Russell | 227/40 |
| 4,419,803 | A | * | 12/1983 | Thornton et al. | 29/428 |
| 4,732,307 | A | * | 3/1988 | Hubbard et al. | 227/7 |
| 4,793,540 | A | * | 12/1988 | Mangan et al. | 227/7 |
| 5,058,795 | A | * | 10/1991 | Tonus | 227/7 |
| 5,095,605 | A | * | 3/1992 | Tonus | 29/432 |
| 5,375,315 | A | * | 12/1994 | Griffith et al. | 29/432 |
| 5,379,513 | A | * | 1/1995 | Thompson et al. | 29/772 |
| 5,427,297 | A | * | 6/1995 | Tymianski | 227/109 |
| 6,266,871 | B1 | * | 7/2001 | Edwards | 29/818 |
| 6,378,197 | B1 | | 4/2002 | Hansen | |
| 6,550,659 | B1 | * | 4/2003 | Kortman et al. | 227/44 |
| 6,814,272 | B2 | * | 11/2004 | Storti | 227/100 |
| 6,926,185 | B2 | * | 8/2005 | Svensson | 227/39 |
| 7,036,705 | B1 | | 5/2006 | Fredrickson et al. | |
| 7,047,614 | B2 | * | 5/2006 | Scott et al. | 29/407.05 |
| 7,228,997 | B1 | * | 6/2007 | Thompson | 227/110 |
| 7,954,681 | B2 | * | 6/2011 | Smith et al. | 227/111 |
| 2004/0089695 | A1 | * | 5/2004 | Svensson | 227/99 |

* cited by examiner

AUTOMATED THREE NAIL GUN TOOL DOLLY

CROSS-REFERENCE TO RELATED PATENT APPLICATIONS

This patent application is related to, based upon, and effectively a utility patent application conversion of U.S. Provisional Patent Application Ser. No. 60/960,527 which was filed on Oct. 2, 2007, the date benefits of which are hereby claimed.

FIELD OF THE INVENTION

The present invention relates generally to assembly apparatus, and more particularly to a new and improved automated three nail gun tool dolly which is uniquely structured, operated, and mounted so as to be capable of firing and inserting two, three, or four nails into top and bottom plate, header, or footer members at predetermined locations thereof so as to fixedly secure such top and bottom plate, header, or footer members to laterally spaced 2×4 or 2×6 stud frame members of a wall panel or wall structure. More particularly, the three nail guns are mounted upon movable assemblies which not only permit the guns to be moved toward or away from, for example, the 2×4 wall stud frame members of the wall structure or wall panel, as well as the top or bottom plate, header, or footer members to be attached thereto, so as to in fact be capable of attaching a predetermined part of the top or bottom plate, header, or footer members to a particular wall stud frame members of the laterally separated 2×4 wall stud frame members of the wall structure or wall panel. In addition, the nail guns are mounted at different vertical locations so as to permit the nail guns to be sequentially capable of firing and inserting nails into predetermined parts of the top or bottom plate, header, or footer members as well as into predetermined parts of a particular wall stud frame member of the laterally separated 2×4 wall stud frame members of the wall structure or wall panel in accordance with a continuous movement of the nail guns or, in other words, in accordance with an “on the fly” mode of operation whereby the nails would be inserted into the predetermined parts of the top or bottom plate, header, or footer members, as well as into predetermined parts of a particular wall stud frame member of the laterally separated 2×4 wall stud frame members of the wall structure or wall panel, in a vertically oriented plane. Still further, the nail guns are capable of being moved vertically so as to in fact permit multiple nails to be fired and inserted into the top or bottom plate, header, or footer members to be attached to the various laterally spaced 2×4 wall stud frame members of the wall structure or wall panel in accordance with different modes of operation.

BACKGROUND OF THE INVENTION

In connection with the fabrication of wall panels or wall structures, building codes, enacted within some regions of the country, or within various countries, sometimes require that fastening plates, headers, or footers be fixedly secured to the top and bottom regions of the 2×4 or 2×6 wall stud members of the wall panels or wall structures by means of three or more nails. Sometimes two nails are acceptable if they are sufficiently large, however, three or four nails are usually required. In addition, it is very tedious for operator personnel to manually insert nails into fastening plates, headers, or footers to be fixedly secured to the top and bottom regions of the 2×4 or 2×6 wall stud members of the wall panels or wall structures being fabricated. Conventionally, however, automatic or semi-automatic apparatus does not exist which will in fact permit such automatic assembly operations to be readily implemented.

A need therefore exists in the art for a new and improved automated three gun tool dolly which is uniquely structured, operated, and mounted so as to be capable of automatically firing and inserting, for example, two, three or four nails into the plate, header, or footer members of wall panels or wall structures at predetermined locations thereof so as to fixedly secure such top and bottom plate, header, or footer members to 2×4 or 2×6 stud frame members of the wall panel or wall structure being fabricated.

SUMMARY OF THE INVENTION

The foregoing and other objectives are achieved in accordance with the teachings and principles of the present invention through the provision of a new and improved three nail gun tool dolly which comprises three nail guns which are mounted upon a horizontally movable carriage assembly and which are staggered or offset with respect to each other in both vertical and horizontal directions such that the three guns are effectively disposed within a diagonal array, that is, a first rightmost one of the three nail guns is disposed at a first predetermined elevation, the second central one of the three nail guns is located at a second predetermined elevation which is somewhat higher than that of the first nail gun and spaced a predetermined distance to the left of the first rightmost nail gun, and the third leftmost one of the three nail guns is located at a third predetermined elevation that is somewhat higher than that of the second central one of the three nail guns and spaced a predetermined distance to the left of the second central nail gun. The carriage assembly is movably mounted upon a pair of horizontally oriented guide rails such that the three nail guns, movable upon the carriage assembly along the horizontally oriented guide rails, can fire and insert the nails into the top and bottom plate, header, or footer members as well as the 2×4 or 2×6 stud frame members of the wall panel or wall structure being fabricated. The carriage assembly is automatically controlled, such as, for example, by means of a programmable logic controller (PLC), such that the three nail guns are sequentially disposed in a continuously movable manner at predetermined firing positions at which the nail guns are sequentially fired so as to insert nails within predetermined regions of the top or bottom plate, header or footer members, as well as the 2×4 or 2×6 stud members, in order to fixedly secure the plate, header or footer members to the stud frame members of the wall panel or wall structure. The nail guns are thus fired in an “on the fly” mode of operation.

In addition, a vertical element sensor (VES), which may be, for example, a photoelectric, ultrasonic, or similar detector, is operatively mounted upon the carriage assembly so as to detect the presence of the edge portion of an oncoming or upcoming 2×4 or 2×6 stud member, and this signal, along with a signal from the encoder, operatively associated with the drive mechanism of the carriage assembly, is transmitted to the programmable logic controller (PLC) 132. Still further, since the thickness dimension of the 2×4 or 2×6 is known which can then enable the determination of the central portion of each 2×4 or 2×6 stud member into which the nails are to be driven, and since the position of the encoder is also known through means of its motor drive, the programmable logic controller (PLC) 132 can, in turn, or accordingly, transmit suitable signals to the three nail guns in order to fire the same at precise times in order to insert nails into the 2×4 or 2×6 stud members at their particular height or elevational positions as well as in a vertically oriented linear plane. Still yet further, another sensor is also mounted upon the carriage assembly to detect the presence of the materials comprising the wall panel or wall structure to be fabricated, that is, the top or bottom plate, header or footer members, as well as the 2×4 or 2×6 stud members, in order to determine that the wall panel or wall structure to be fabricated is in fact present and that the guns are not simply fired into space, which can obviously be harmful to operator personnel, and are in fact fired and inserted into the wall panel or wall structure being fabricated.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
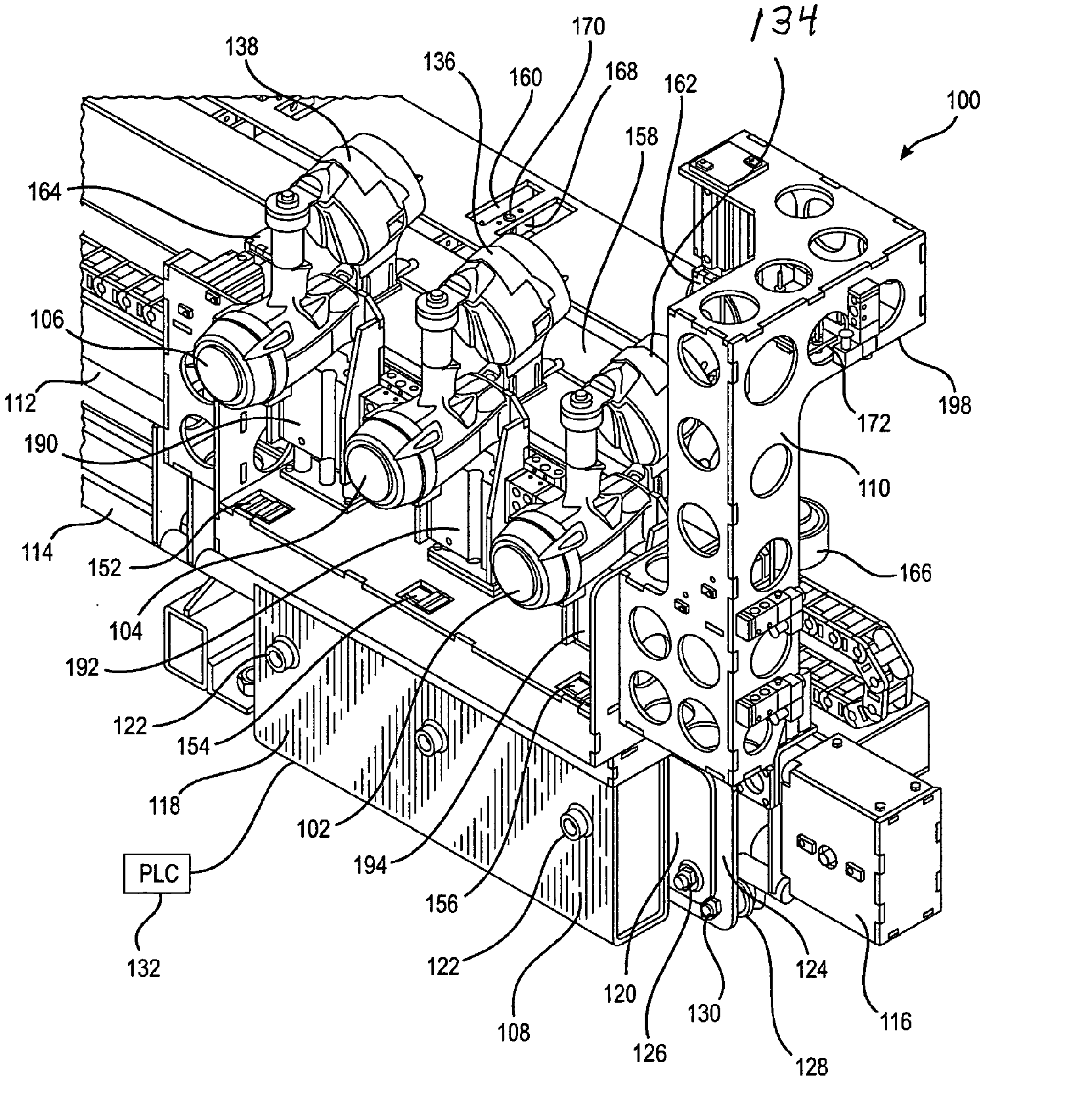
FIG. 1 is a perspective view of a new and improved automated nail gun tool dolly constructed in accordance with the principles and teachings of the present invention and showing the cooperative parts thereof, wherein the automated nail gun tool dolly comprises, for example, three nail guns which are vertically and horizontally staggered so as to be disposed within a diagonal array.

Referring now to the drawings, and more particularly to FIG. 1 thereof, a new and improved automated three nail gun tool dolly, as constructed in accordance with the principles and teachings of the present invention and showing the component parts thereof, is disclosed and is generally indicated by the reference character 100. More particularly, it is seen that the new and improved automated three nail gun tool dolly 100 comprises a plurality of nail guns, such as, for example, three nail guns 102,104,106, and it is seen that the nail guns 102, 104,106 are all mounted upon a carriage assembly 108 which itself is mounted upon a suitable framework 110. The carriage assembly 108 and framework 110 are adapted to be movable in the horizontal direction, and toward the right as viewed within FIG. 1, although FIG. 1 effectively discloses the end of movement of the carriage assembly 108, as a result of being movably mounted upon a pair of upper and lower guide rails 112,114, and it is also to be appreciated that the carriage assembly 108 and the framework 110 are movable toward the right by means of, for example, a suitable motor drive which comprises a drive motor, not shown, and drive sprocket, also not shown, a chain drive containing an encoder, also not shown, and a driven sprocket not shown but which is adapted to be disposed within a driven sprocket housing 116. The carriage assembly 108 is seen to comprise a main carriage member 118, a first plate 120 to which the main carriage member 118 is bolted by means of a plurality of bolt fasteners 122, a second plate 124 to which the first plate 120 is bolted by means of additional bolt fasteners 126, and it is also noted that a plurality of rollers 128, only one of which is visible, are mounted upon the second plate 124 through means of a plurality of fasteners 130 so as to be rollably engaged, for example, with the upper and lower guide rails 112,114 along which the entire carriage assembly 108 is movably disposed. Control of the motor drive for movement of the carriage assembly 108 along the guide rails 112,114 is controlled, for example, by means of a suitable programmable logic controller (PLC) 132.

Figure 3:
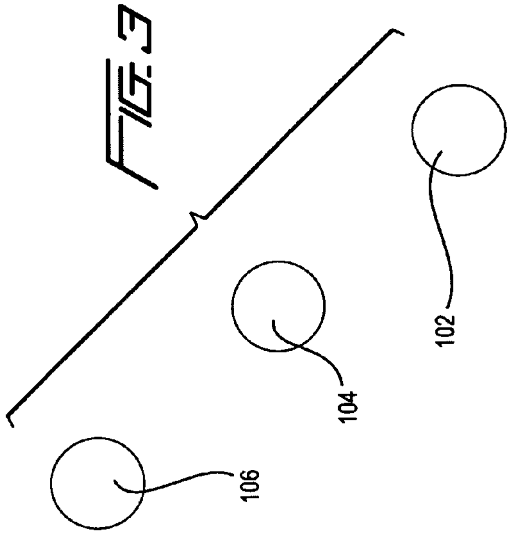
FIG. 3 is a schematic drawing illustrating the relative disposition of the three nail guns which are capable of inserting nails at predetermined locations into side portions of 2×4 or 2×6 plate, header, or footer members of a wall structure or wall panel.

Each one of the three nail guns 102,104,106 is provided with its own supply of nails by means of a suitable canister or magazine 134,136,138, and it is also to be noted that the three nail guns 102,104,106 are disposed within a vertically and horizontally staggered pattern or arrangement, as can best be appreciated from FIG. 3, whereby the three nail guns will, more particularly, effectively be disposed within a diagonal array. More particularly, the first rightmost one of the three nail guns 102,104,106 is disposed at a first predetermined lowermost elevation, the second central one of the three nail guns 104 is located at a second predetermined elevation which is somewhat higher than that of the first nail gun 102 and spaced a predetermined distance to the left of the first rightmost nail gun 102, and the third leftmost one of the three nail guns 106 is located at a third predetermined elevation that is somewhat higher than that of the second central one of the three nail guns 104 and spaced a predetermined distance to the left of the second central nail gun 104. Since the movement of the carriage assembly and framework 108,110 along the guide rails 112,114 is controlled by means of, for example, the programmable logic controller (PLC) 132 and the operatively associated encoder, then when a first nail 140 is to be inserted into the end region of a plate, header or footer members 142 to be secured the 2×4 or 2×6 stud frame members 144 of the wall panel or wall structure 146 being fabricated, as illustrated within FIG. 4, the carriage assembly 108 will have been moved along the guide rails 112,114 and will have approached a predeterminedly known region of the plate, footer, or header member 142, as well as the particular 2×4 or 2×6 stud frame member 144, as will be explained more fully hereinafter, the first lower-most one of the nail guns 102 will be disposed directly opposite the lower face region of the 2×4 144 and the plate, header, or footer member 142 of the wall panel or wall structure into which the first nail 140 is to be driven and inserted, and the programmable logic controller (PLC) 132 will in fact transmit a signal which will fire the first nail gun 102 so as to in fact insert the first nail 140 into plate, header, or footer member 142 of the wall panel or wall structure 146 being fabricated as well as into the particular 2×4 or 2×6 144.

Upon completion of such a firing operation, the carriage assembly 108 continues to move toward the right, as viewed within FIG. 1, so as to effectively bring the second central one of the nail guns 104 directly opposite the central region of the plate, header, or footer member 142 of the wall panel or wall structure, as well as the central region of the 2×4 or 2×6 144 into which the second nail is to be driven and inserted. The second nail gun 104 is then fired such that a second nail is now disposed within the central region of the plate, header, or footer member 142, as well as within the central region of the 2×4 or 2×6 144, as is illustrated at 148 within FIG. 4, and upon completion of such a second firing operation, the carriage assembly 108 continues to move toward the right so as to effectively bring the third uppermost one of the nail guns 106 directly opposite an upper side region of the plate, header, or footer member 142 of the wall panel or wall structure, as well as directly opposite the 2×4 or 2×6 144 into which the third nail is to be driven and inserted.

Figure 4:
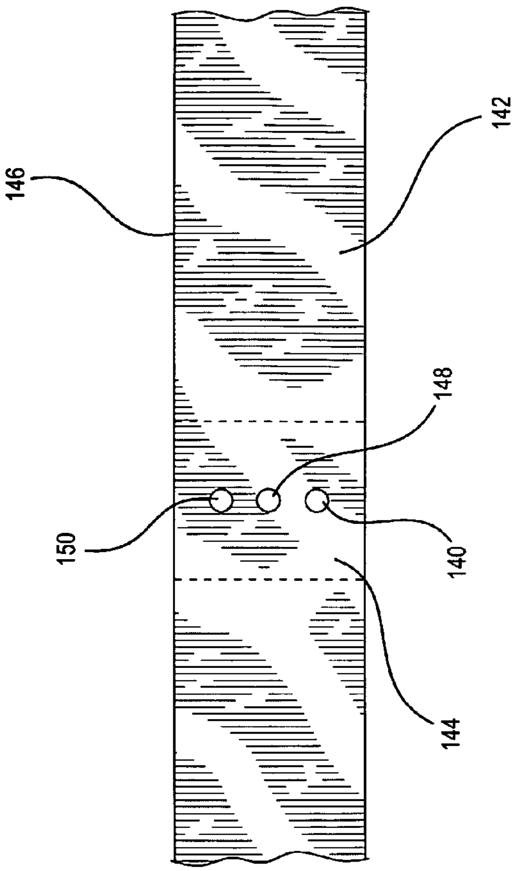
FIG. 4 is a schematic view showing the side face of, for example, a 2×4 plate, header, or footer member into which three nails have been inserted by means of the three nail guns that are mounted upon the new and improved automated nail gun tool dolly illustrated within FIG. 1, and as schematically illustrated within FIG. 3, so as to fixedly secure the plate, header, or footer member to stud frame members of the wall panel or wall structure.

The third nail gun 106 is then fired such that a third nail is disposed within the upper side region of the plate, header, or footer member 142, as well as within the upper region of the 2×4 or 2×6 144, as illustrated at 150 within FIG. 4, and upon completion of such firing operation, the carriage assembly 108 continues to move toward the right until the lowermost one of the nail guns 102 is again disposed directly opposite a lower face region of the plate, header, or footer member, as well as a lower face region of the next 2×4 or 2×6 to which the plate, header, or footer member 142 is to be affixed so as to continue the fabrication of the wall panel or wall structure. It is of course to be noted, as can be best appreciated from FIG. 4, that while the three nail guns 102,104,106 are located in the previously noted vertically and horizontally offset pattern such that the three nail guns 102,104,106 are effectively disposed in a diagonal array with respect to each other as illustrated within FIG. 3, the control of the carriage assembly 108, and the actual firing of the nail guns 102,104,106, all under the control of the programmable logic controller (PLC) 132, permits the three nails 140,148,150 to be inserted into the plate, header, or footer member, as well as within the particular 2×4 or 2×6 to which the plate, header, or footer member 142 is to be affixed, in accordance with a vertically oriented linear array or arrangement as desired.

It is to be noted that, in connection with securing a plate, header, or footer member to the different 2×4 or 2×6 stud frame members of the wall panel or wall structure, all of the nail guns 102,104,106 may be horizontally movable toward and away from the plate, header, or footer member which are to be affixed to the different 2×4 or 2×6 stud frame members of the wall panel or wall structure. In other words, the plurality of nail guns 102,104,106 are movable between retracted inoperative positions and extended operative firing positions at which the nail guns 102,104,106 will be fired so as to insert the various nails into the plate, header, or footer member which are to be affixed to the different 2×4 or 2×6 stud frame members of the wall panel or wall structure. In order to achieve such movements, each one of the nail guns 102,104,106 respectively has a piston-cylinder assembly 152,154,156, operatively associated therewith and controlled by the programmable logic controller (PLC) 132 so as to in fact move the nail guns 102,104,106 between their aforenoted extended and retracted positions. The automated three nail gun tool dolly 100 is also provided with an upper deck 158 along which the plate, header, or footer member and the different 2×4 or 2×6 stud frame members of the wall panel or wall structure are located so as to be properly supported during the firing of the three nail guns 102,104,106, and the front of the upper deck 158 is provided with an upstanding lip 160, that is, part of the lip 160 projects above the flat horizontally oriented surface of the upper deck 158, upon which the plate, header, or footer member 142 is adapted to be disposed, so that the entire wall panel or wall structure, comprising the plate, header, or footer member and the different 2×4 or 2×6 stud frame members, will in fact be properly located relative to the three nail guns 102,104,106.

Along these lines, or in conjunction with this structure, the automated three nail gun tool dolly 100 is also provided with a top pressure roller 162, and a pair of laterally spaced side pressure rollers 164,166 which likewise engage the upper surface and side surface portions of, for example, the plate, header, or footer member 142 so as to properly maintain the same in its proper position upon the upper deck 158, particularly during the firing modes of the nail guns 102,104,106. It is noted that the top pressure roller 162 partially engages, for example, the forwardmost 2×4 or 2×6 stud member opposite nail gun 102, as well as partially engages the plate, header, or footer member 142, so as to effectively maintain the upper surface portions of the particular 2×4 or 2×6 stud member and the plate, header, or footer member 142, substantially flush with respect to each other so that the plate, header, or footer member 142 can be properly secured to the particular 2×4 or 2×6 stud member 144. Continuing still further, a pair of stud locators 168, 170 are provided within the upper deck 158 for each 2×4 or 2×6 stud member 144 in order to maintain the stud members 144 disposed properly perpendicular to the plate, header, or footer member 142. The pair of stud locators 168,170 are adapted to abut the opposite sides of each stud member 144, and it is noted, for example, that stud locator 168 is fixed with respect to the upper deck 158 although it projects upwardly through the upper deck 158 so as to engage, for example, the left side of the particular stud member 144, while the stud locator 170, while also projecting upwardly through the upper deck 158, is laterally movable by means of, for example, a suitable piston-cylinder assembly, not shown, so as to be movable into abutment with, for example, the right side of the particular stud member 144, so as to effectively cooperate with the stud locator 168 and thereby clamp the particular stud member 144 therebetween.

Figure 2:
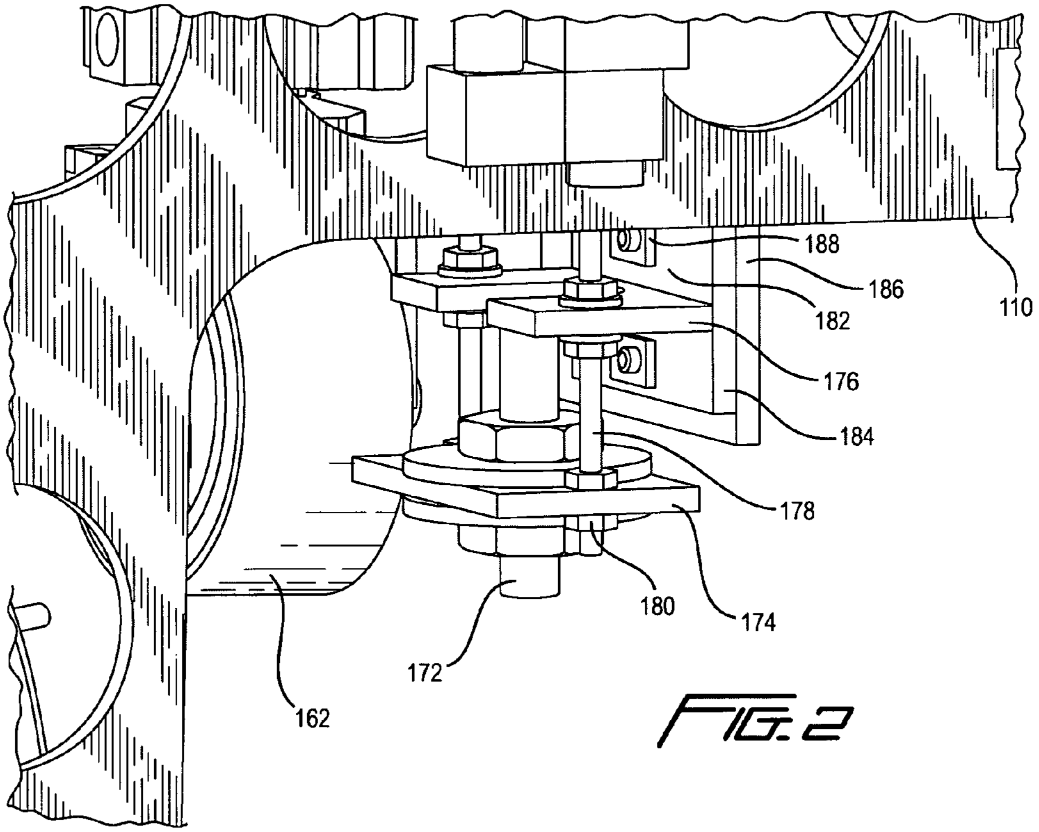
FIG. 2 is an enlarged schematic view of the vertical element sensor (VES) of the automated three nail gun tool dolly illustrated within FIG. 1.

Continuing still further, and with particular reference being made to FIG. 2, the new and improved automated three nail gun tool dolly 100 is also provided with a vertical element sensor (VES) 172 which can detect the upcoming presence of a particular 2×4 or 2×6 stud member 144. The vertical element sensor (VES) 172 is located adjacent to the top pressure roller 162 and may comprise any suitable sensor, such as, for example, a photoelectric sensor, ultrasonic sensor, and the like. The vertical element sensor (VES) 172 is adapted to be movable in six degrees of freedom along three mutually orthogonal axes X,Y,Z. The vertical element sensor 172 is mounted, for example, upon a plurality of plates 174, and the plurality of plates are, in turn, mounted upon a horseshoe shaped plate 176 by means of a pair of upstanding threaded rods 178 and nuts 180 which permits the vertical element sensor (VES) 172 to be vertically adjustable along, for example, axis Z, relative to the plate 176 by means of threaded adjustment of the rods 178. This permits the vertical element sensor (VES) 172 to sense the elevational location of the 2×4 or 2×6 stud member 144. The rods 178 and the nuts 180 are also adjustably mounted within the horseshoe shaped plate 176 by means of slots 182 whereby the vertical element sensor (VES) 172 is also movably adjustable along the X axis. This permits the vertical element sensor (VES) 172 to determine the distance between the vertical element sensor (VES) 172 and the particular nail gun to be fired. It is lastly seen that the horseshoe shaped plate 176 is fixedly mounted upon a support plate 184 and that the support plate 184 is in turn mounted upon a main plate 186 by means of bolt fasteners 188 which are also disposed within horizontally oriented slots, not shown, which permits the support plate 184 to be movably mounted in an adjustable manner upon the main plate 186 along the Y axis. This permits the vertical element sensor (VES) 172 to determine how far ahead of the particular 2×4 or 2×6 stud member 144 the vertical element sensor (VES) 172 is located and therefore what the distances of the three nail guns 102,104,106 are to the particular 2×4 or 2×6 stud member 144 are. These adjustable movements of the vertical element sensor (VES) 172 permit the same to be adjustably mounted, or in effect, calibrated with respect to the proper location of the individual 2×4 or 2×6 stud members and the nail guns 102, 104,106. This information is of course transmitted to the programmable logic controller (PLC) 132.

It is lastly noted that in connection with each one of the nail guns 102,104,106, pneumatically controlled piston-cylinder assemblies 190,192,194 are respectively operatively associated so as to elevate each one of the nail guns 102,104,106 between first and second positions such that different modes of operation, that is, different patterns of inserting nails into the plate, header, or footer member 142, as well as into each one of the 2×4 or 2×6 stud members 144, can be achieved as illustrated, for example, within FIGS. 5A-5D. For example, as can be readily appreciated from FIG. 5A, when two nails are adapted to be inserted into the plate, header, or footer member 142, as well as into each one of the 2×4 stud members 144, only the 2×4 stud member 144 being illustrated for descriptive purposes, the first gun 102 is disposed at its normal lowermost position of, for example, ¾ of an inch (0.75") above the bottom surface 196 of the 2×4 stud member 144 which actually has a height dimension of approximately 3½ inches (3.50"). The third gun 106 will be located at its normal lowermost position of, for example, 2¾ inches (2.75") above the bottom surface 196 of the 2×4 stud member 144, and the second gun 104 will not be fired. Accordingly, the two nails from the first and third nail guns 102,106 can be inserted into the 2×4 stud member 144 in accordance with the firing mode pattern initiated by means of the programmable logic controller (PLC) 132 as will be explained more fully shortly hereafter.

Figure 5A:
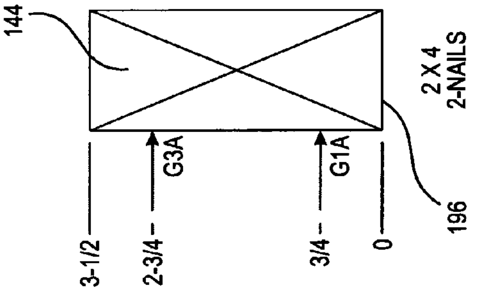
FIG. 5A is a schematic illustration of how the three nail guns are used to insert two nails into a 2×4 stud member.
Figure 5B:
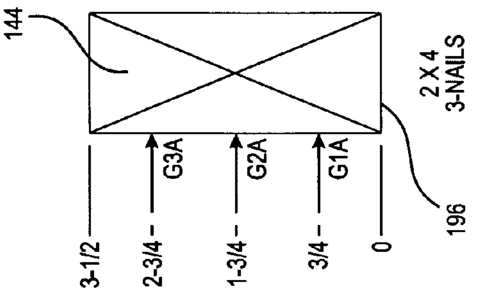
FIG. 5B is a schematic illustration of how the three nail guns are used to insert three nails into a 2×4 stud member.
Figure 5C:
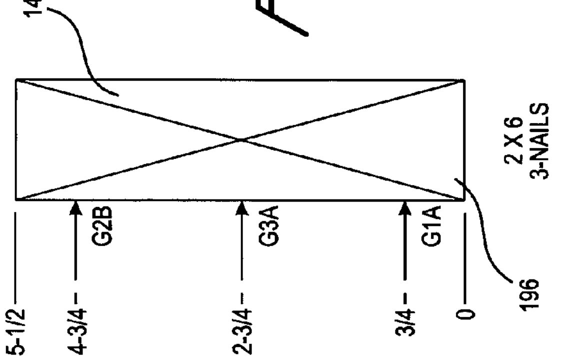
FIG. 5C is a schematic illustration of how the three nail guns are used to insert three nails into a 2×6 stud member.

In a similar manner, as illustrated within FIG. 5B, when three nails are adapted to be inserted into the plate, header, or footer member 142, as well as into each one of the 2×4 stud members 144, only the 2×4 stud member 144 again being illustrated for descriptive purposes, the first gun 102 is disposed at its normal lowermost position of, for example, ¾ of an inch (0.75") above the bottom surface 196 of the 2×4 stud member 144, the second gun 104 is disposed at its normal lowermost position of, for example, 1¾ inches (1.75"), and the third gun 106 will again be located at its normal lowermost position of, for example, 2¾ inches (2.75") above the bottom surface 196 of the 2×4 stud member 144. Accordingly, the three nails from the first, second, and third nail guns 102, 104,106 can be inserted into the 2×4 stud member 144 in accordance with the firing mode pattern initiated by means of the programmable logic controller (PLC) 132. Continuing still further, when three nails are adapted to be inserted into the plate, header, or footer member 142, as well as into each one of the 2×6 stud members 144, as illustrated within FIG. 5C, only the 2×6 stud member 144 being illustrated for descriptive purposes, the first gun 102 is disposed at its normal lowermost position of, for example, ¾ of an inch (0.75") above the bottom surface 196 of the 2×6 stud member 144 which actually has a height dimension of approximately 5½ inches (5.50"). The third gun 106 will be located at its normal lowermost position of, for example, 2¾ inches (2.75") above the bottom surface 196 of the 2×6 stud member 144, however, the second gun 104 will have been moved upwardly from its normal lowermost position of 1¾ inches (1.75") to its uppermost position of 4¾ inches (4.75") as a result of the actuation of the piston-cylinder assembly 192, the stroke of the piston-cylinder assembly 192 therefore being approximately three inches (3.00"). Accordingly, the three nails from the first, second, and third nail guns 102, 104,106 can be inserted into the 2×6 stud member 144 in accordance with the firing mode pattern initiated by means of the programmable logic controller (PLC) 132.

Figure 5D:
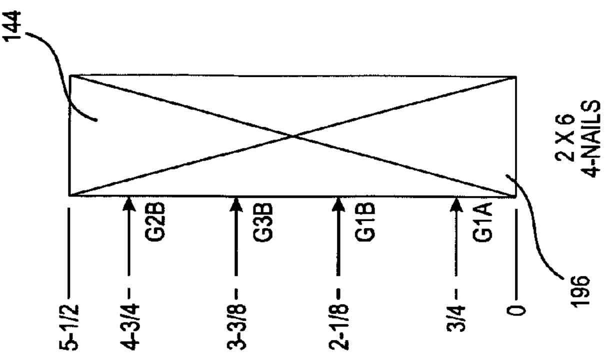
FIG. 5D is a schematic illustration of how the three nail guns are used to insert four nails into a 2×6 stud member.

Lastly, as illustrated within FIG. 5D, when four nails are adapted to be inserted into the plate, header, or footer member 142, as well as into each one of the 2×6 stud members 144, only the 2×6 stud member 144 again being illustrated for descriptive purposes, in order to achieve the nailing operations in a continuous "on the fly" mode of operation, two oppositely oriented passes of the nail guns 102, 104,106 will occur with respect to the particular 2/6 stud members 144. During, for example, the first pass of the nail guns 102,104, 106 from left to right as viewed within FIG. 1, the first gun 102 is disposed at its normal lowermost position of, for example, ¾ of an inch (0.75") above the bottom surface 196 of the 2×6 stud member 144, while the second gun 104 will be disposed at its uppermost position of 4¾ inches (4.75") as a result of the actuation of the piston-cylinder assembly 192.

In a similar manner, the third nail gun 106 will have been moved from its normal lowermost position of 2¾ inches (2.75") to its uppermost position of 3⅜ inches (3.375") by means of the piston-cylinder assembly 194 which therefore has a stroke of approximately ⅝ of an inch (0.625"). Accordingly, the three nails from the first, second, and third nail guns 102,104,106 can be inserted into the 2×6 stud member 144 in accordance with the firing mode pattern initiated by means of the programmable logic controller (PLC) 132. Still further, during the second oppositely oriented directional pass of the automated three nail gun tool dolly 100, that is, from right to left, the first gun 102 will have been moved upwardly from its normal lowermost position of ¾ of an inch (0.75") to a height of 2⅛ inches (2.125") whereby it is appreciated that the piston-cylinder assembly 190 has a stroke of approximately 1⅜ inches (1.375"). Accordingly, four nails from the three nail guns 102,104,106 can be inserted into the 2×6 stud member 144 in accordance with the firing mode pattern initiated by means of the programmable logic controller (PLC) 132.

It is to be noted that in connection with the controlled firing of the nail guns 102,104,106 by means of the programmable logic controller (PLC) 132, various data is pre-programmed into the programmable logic computer (PLC) 132 such as, for example, the size or width dimension of each 2×4 or 2×6, the order they are disposed in so as to in fact fabricate the wall panel or wall structure, the speed of the carriage assembly 108, the distances between the nail guns 102,104,106 and the like. Also, the rotary encoder, not shown, is mounted upon the motor drive chain for the carriage, so that once the system is activated, and the motor drive drives the carriage, the rotary encoder begins its count. At the beginning of an assembly operation, the nail guns 102,104,106 have been moved to their retracted positions away from the wall panel or wall structure by means of the piston-cylinder assemblies 152, 154,156, and therefore, at the commencement of a nailing operation, the nail guns 102,104, 106 are effectively advanced toward the wall panel or wall structure by means of the piston-cylinder assemblies 152,154, 156. Also, the mechanisms for controlling the dispositions of the top and side pressure rollers 162,164,166 are also activated under the control of the programmable logic controller (PLC) 132. In addition, as the carriage moves along its rails 112, 114 from one end of the framing table, not shown but upon which the wall panel or wall structure is disposed for assembly, and approaches a particular 2×4 or 2×6 stud member, the vertical element sensor (VES) 172, also disposed upon the overall carriage assembly and framework 108,110 will detect the approaching edge portion of the stud member and will communicate its distance from the approaching stud member to the programmable logic controller (PLC) 132.

Since the programmable logic controller (PLC) 132 knows the thickness dimensions of all the stud members, since they are either 2×4 or 2×6 stud members, it can calculate the center position of the stud member where the nails are to be inserted as schematically illustrated within FIG. 4. Accordingly, appropriate signals will be transmitted to the particular nail guns 102,104,106 so as to fire the same precisely in accordance with the previously described firing modes of operation as schematically illustrated within FIGS. 5A-5D. Lastly, there is also a material presence sensor 198 which is also mounted upon the framework 110 and at a position slightly ahead of the vertical element sensor (VES) 172. The material presence sensor 198 is provided so as to ensure that material, that is, the plate, header, or footer member and the different 2×4 or 2×6 stud frame members comprising the wall panel or wall structure, are actually present so that the nail guns 102, 104,106 do not fire into the air or other open space which could present dangerous situations for operator personnel.

Thus, it may be seen that in accordance with the principles and teachings of the present invention, there has been disclosed a new and improved automated gun tool dolly which comprises a plurality of nail guns, such as, for example, three nail guns, which are mounted upon a horizontally movable carriage assembly in a vertically and horizontally staggered mode so as to be disposed within a diagonal array. Movement of the carriage assembly along horizontally oriented guide rails is automatically controlled, such as, for example, by means of a programmable logic controller (PLC), such that the three nail guns are sequentially and continuously disposed at predetermined firing positions at which the nail guns are sequentially fired so as to insert nails within predetermined regions of 2×4 or 2×6 plate, header, or footer members of a wall panel or wall structure. The programmable logic controller (PLC) controls the movement of the carriage assembly in accordance with known wall panel or wall structure parameters which have been programmed into the programmable logic controller (PLC). In addition, the nail guns are provided with coil type magazines so as to contain a large number or supply of nails.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An automated nail gun tool dolly, for driving a plurality of nails ‘into a structure such that the plurality of nails forms a vertically oriented linear array, comprising:

a carriage assembly;

a plurality of nail guns mounted upon said carriage assembly in a predetermined vertically and horizontally spaced, offset mode with respect to each other whereby the plurality of nail guns are effectively disposed in a diagonal array; and a drive system for intermittently moving said carriage assembly in a horizontal direction, along a horizontal locus, so as to sequentially present each one of said plurality of nail guns at predetermined lower, intermediate, and upper positions which are vertically aligned with a predetermined location along said horizontal locus at which said carriage assembly is stopped during said intermittent movement of said carriage assembly by said drive system along said horizontal locus, such that the nails are driven into the structure in a vertically oriented linear array at a location corresponding to said predetermined location along said horizontal locus at which said carriage assembly is stopped by said drive system and in accordance with the predetermined vertical spacing defined between said predetermined lower, intermediate, and upper positions of said plurality of nail guns.

2. The automated nail gun tool dolly as set forth in claim 1, wherein:

said plurality of nail guns comprises three nail guns for inserting at least two, three, and four nails into the structure into which the nails are to be driven.

3. The automated nail gun tool dolly as set forth in claim 2, wherein:

a first rightmost one of said three nail guns is disposed at a first predetermined elevation, said second central one of the three nail guns is located at a second predetermined elevation which is somewhat higher than that of said first nail gun and spaced a predetermined distance to the left of the first rightmost nail gun, and said third leftmost one of the three nail guns is located at a third predetermined elevation that is somewhat higher than that of the second central one of the three nail guns and spaced a predetermined distance to the left of the second central nail gun so as to define said diagonal array.

4. The automated nail gun tool dolly as set forth in claim 2, further comprising:

a programmable logic controller (PLC);

said drive system comprises a motor drive and a rotary encoder for transmitting the position of said carriage assembly and said three nail guns to said programmable logic controller (PLC) in order to fire said three nail guns at precisely the correct time in order to insert the nails into the structure.

5. The automated nail gun tool dolly as set forth in claim 4, further comprising:

a vertical element sensor (VES) for determining the location of a stud member of said structure into which the nails are to be inserted.

6. The automated nail gun tool dolly as set forth in claim 5, wherein:

said vertical element sensor (VES) is adjustable in a calibrated manner in accordance with six degrees of freedom along three mutually orthogonal axes in order to permit said vertical element sensor (VES) to be vertically adjustable along, for example, a first axis Z, in order to permit the vertical element sensor (VES) to sense the elevational location of the stud member, in order to permit said vertical element sensor (VES) to be horizontally adjustable along, for example, a second axis X in order to permit said vertical element sensor (VES) to determine the distance between the vertical element sensor (VES) and the particular nail gun to be fired, and in order to permit said vertical element sensor (VES) to be horizontally adjustable along, for example, a third axis Y in order to permit the vertical element sensor (VES) to determine how far ahead of the particular stud member 144 the vertical element sensor (VES) 172 is located and therefore what the distances of the three nail guns are to the particular stud member, such information being conveyed to said programmable logic controller (PLC).

7. The automated nail gun tool dolly as set forth in claim 4, further comprising:

second actuators for raising and lowering said three nail guns to different elevational positions so as to achieve different insertions modes of nails into the structure.

8. The automated nail gun tool dolly as set forth in claim 7, wherein:

said second actuators for raising and lowering said three nail guns to different elevational positions so as to achieve said different insertions modes of nails into the structure comprises three different piston-cylinder assemblies for raising and lowering said first, second, and third guns between first normal lowermost positions and second uppermost positions.

9. The automated nail gun tool dolly as set forth in claim 8, wherein:

when two nails are adapted to be inserted into a 2×4 stud member of the structure, said first piston-cylinder assembly will dispose said first gun at its first normal lowermost position, said third piston-cylinder assembly will dispose said third gun at its first normal lowermost position, and said programmable logic controller (PLC) will transmit signals only to said first and third nailing guns so as to fire said first and third nailing guns at said first normally lowermost positions.

10. The automated nail gun tool dolly as set forth in claim 8, wherein:

when three nails are adapted to be inserted into a 2×4 stud member of the structure, said first piston-cylinder assembly will dispose said first gun at its first normal lowermost position, said second piston-cylinder assembly will dispose said second gun at its first normal lowermost position, said third piston-cylinder assembly will dispose said third gun at its first normal lowermost position, and said programmable logic controller (PLC) will transmit signals to said first, second, and third nailing guns so as to fire said first, second, and third nailing guns at said first normally lowermost positions.

11. The automated nail gun tool dolly as set forth in claim 8, wherein:

when three nails are adapted to be inserted into a 2×6 stud member of the structure, said first piston-cylinder assembly will dispose said first gun at said first normal lowermost position, said second piston-cylinder assembly will dispose said second gun at said second uppermost position, said third piston-cylinder assembly will dispose said third gun at said first normal lowermost position, and said programmable logic controller (PLC) will transmit signals to said first, second, and third nailing guns so as to fire said first, second, and third nailing guns at said firing positions.

12. The automated nail gun tool dolly as set forth in claim 8, wherein:

when four nails are adapted to be inserted into a 2×6 stud member of the structure, said first piston-cylinder assembly will dispose said first gun at said first normal lowermost position, said second piston-cylinder assembly will dispose said second gun at said second uppermost position, said third piston-cylinder assembly will dispose said third gun at said second uppermost position, and said programmable logic controller (PLC) will cause said means for moving said carriage assembly to move said carriage assembly in a first direction so as to sequentially present each one of said plurality of nail guns at said predetermined positions with respect to the structure into which the nails are to be driven such that the nails are driven into the structure in a vertically oriented linear array, however, said programmable logic controller (PLC) will subsequently cause said first piston-cylinder assembly to dispose said first nailing gun at said second uppermost position and to cause said means for moving said carriage assembly to move said carriage assembly in a second opposite direction so as to again fire said first nailing gun at said predetermined position with respect to the structure into which the nails are to be driven such that the nails are driven into the structure in a vertically oriented linear array comprising said four nails.

13. The automated nail gun tool dolly as set forth in claim 1, further comprising:

first actuators for moving said plurality of nail guns toward and away from the structure, into which the nails are to be driven, between inoperative non-firing modes and operative firing modes.

14. The automated nail gun tool dolly as set forth in claim 13, wherein:

said first actuators for moving said plurality of nail guns toward and away from the structure, into which the nails are to be driven, between inoperative non-firing modes and operative firing modes comprise first piston-cylinder assemblies.

15. A method of inserting nails into a structure by an automated nail gun tool dolly, comprising the steps of:

providing a carriage assembly;

providing a programmable logic controller (PLC);

mounting a plurality of nail guns upon said carriage assembly in a predetermined vertically and horizontally spaced, offset mode with respect to each other whereby the plurality of nail guns are effectively disposed in a diagonal array; and intermittently moving said carriage assembly in a horizontal direction, along a horizontal locus, so as to sequentially present each one of said plurality of nail guns at predetermined lower, intermediate, and upper positions which are vertically aligned with a predetermined location along said horizontal locus at which said carriage assembly is stopped during said intermittent movement of said carriage assembly along said horizontal locus, such that the nails are driven into the structure in a vertically oriented linear array at a location corresponding to said predetermined location along said horizontal locus at which said carriage assembly is stopped and in accordance with the predetermined vertical spacing defined between said predetermined lower, intermediate, and upper positions of said plurality of nail guns.

16. The method as set forth in claim 15, further comprising the steps of:

when two nails are adapted to be inserted into a 2×4 stud member of the structure, said first gun will be disposed at its first normal lowermost position, said third gun will be disposed at its first normal lowermost position, and said programmable logic controller (PLC) will transmit signals only to said first and third nailing guns so as to fire said first and third nailing guns at said first normally lowermost positions.

17. The method as set forth in claim 15, further comprising the steps of:

when three nails are adapted to be inserted into a 2×4 stud member of the structure, said first gun will be disposed at its first normal lowermost position, said second gun will be disposed at its first normal lowermost position, said third gun will be disposed at its first normal lowermost position, and said programmable logic controller (PLC) will transmit signals to said first, second, and third nailing guns so as to fire said first, second, and third nailing guns at said first normally lowermost positions.

18. The method as set forth in claim 15, further comprising the steps of:

when three nails are adapted to be inserted into a 2×6 stud member of the structure, said first gun will be disposed at said first normal lowermost position, said second gun will be disposed at said second uppermost position, said third gun will be disposed at said first normal lowermost position, and said programmable logic controller (PLC) will transmit signals to said first, second, and third nailing guns so as to fire said first, second, and third nailing guns at said firing positions.

19. The method as set forth in claim 15, further comprising the steps of:

when four nails are adapted to be inserted into a 2×6 stud member of the structure, said first gun will be disposed at said first normal lowermost position, said second gun will be disposed at said second uppermost position, said third gun will be disposed at said second uppermost position, and said programmable logic controller (PLC) will cause said carriage assembly to move in a first direction so as to sequentially present each one of said plurality of nail guns at said predetermined positions with respect to the structure into which the nails are to be driven such that the nails are driven into the structure in a vertically oriented linear array, however, said programmable logic controller (PLC) will subsequently cause said first nailing gun to be disposed at said second uppermost position and to cause said carriage assembly to move in a second opposite direction so as to again fire said first nailing gun at said predetermined position with respect to the structure into which the nails are to be driven such that the nails are driven into the structure in a vertically oriented linear array comprising said four nails.

20. The automated nail gun tool dolly as set forth in claim 15, wherein:

said programmable logic controller (PLC) and said drive system control the movement of said three nail guns such that said three nail guns are fired on-the-fly while said drive system is continuously moving said carriage assembly whereby said three nail guns are fired at precisely the correct time in order to insert the nails into the structure.

21. The method as set forth in claim 15, further comprising the step of:

operating said programmable logic controller (PLC) and said drive system so as to control the movement of said three nail guns such that said three nail guns are fired on-the-fly while said drive system is continuously moving said carriage assembly whereby said three nail guns are fired at precisely the correct time in order to insert the nails into the structure.

* * * * *